Mar. 6, 1923.                                                    1,447,610
C. ALLEN
CLASSIFIER AND DEWATERER
Filed July 9, 1921
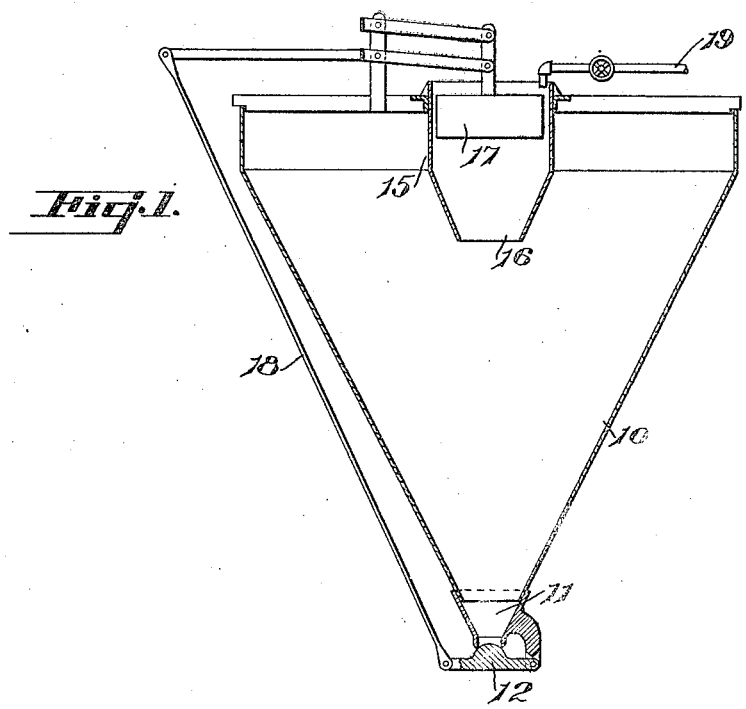
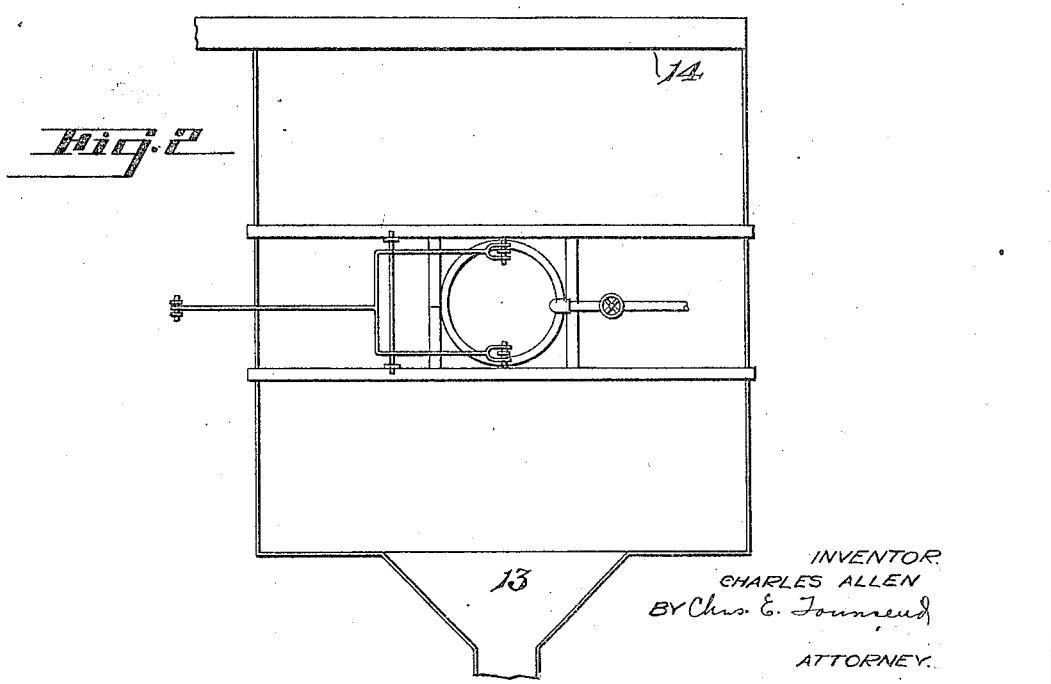
INVENTOR
CHARLES ALLEN
BY Chas. E. Townsend
ATTORNEY.

Patented Mar. 6, 1923.

1,447,610

UNITED STATES PATENT OFFICE.

CHARLES ALLEN, OF EL PASO, TEXAS.

CLASSIFIER AND DEWATERER.

Application filed July 9, 1921. Serial No. 483,506.

*To all whom it may concern:*

Be it known that I, CHARLES ALLEN, a citizen of the United States, residing at El Paso, in the county of El Paso and State of Texas, have invented new and useful Improvements in Classifiers and Dewaterers, of which the following is a specification.

This invention relates to classifiers and dewaterers for use in the treatment of sands, ores, fine coal and the like.

In this type of device a tank is employed having a valve control orifice in its bottom for the discharge of quickly settling or heavy particles, the lighter and more slowly settling particles overflowing the rim. Automatic means is provided for controlling the valve and it is to this automatic means that the present invention particularly relates.

In my Patent No. 1,147,356, dated July 20th, 1915, I have shown a float for operating the valve. This float is positioned in a compartment which latter is arranged in the tank and has a constricted neck or opening at its lower end, through which the feed stream passes into the surrounding tank. When the settled material in the tank reaches the level of the neck, the latter is obstructed and the feed stream continues to rise within the float chamber thereby elevating the float and opening the valve. It will thus be seen that the float is operated by the material undergoing treatment, and where the density of that material varies the action of the float is altered.

In the present invention I employ similar mechanism but with this difference: The feed stream is fed directly to the tank and does not pass through the float chamber. The float chamber is supplied with clear water or other liquid of fixed or unvarying density so that when the material of the tank obstructs the mouth of the float chamber, the water rises in the latter causing the float to be lifted for the purpose of operating the valve. This provision of a supply of liquid for the float chamber separate from the feed stream insures uniform and accurate operation of the valve under any and all conditions.

In the accompanying drawing Fig. 1 shows a vertical central sectional view of a device embodied in my invention.

Fig. 2 shows a plan of the same.

Referring more in detail to the accompanying drawing I provide a tank 10 which is preferably conical in form with its apex disposed at the bottom and provided with an orifice 11 controlled by a valve 12. Material is fed to the tank through a launder 13. The heavier and more quickly settled particles accumulate in the bottom of the tank overlying the discharge orifice and the lighter and more slowly settling particles overflow the rim of the tank at 14.

A compartment 15 somewhat in the shape of a funnel is arranged within the tank with its mouth 16 opening into the interior of the tank at a suitable distance below the rim of the latter. Within the compartment is a float 17 which actuates the valve 12 through suitable mechanism. In the present form of the device I show an arrangement of levers 18, operatively connecting the float and valve, but it is obvious that other connections may be employed as for instance, the float may serve to actuate a switch which closes a circuit through a solenoid, the latter operating the valve.

The compartment is supplied with liquid, preferably clear water, through a valved pipe 19, which pipe is separate from the feed stream. In the operation of the device, when the accumulated material reaches the lower end of the compartment 15, the mouth of the latter is obstructed, thus causing the water entering the compartment 15, through the pipe 19, to rise and lift the float 17. This action causes the valve to open and permit accumulated material to be discharged.

Various changes may be employed in the construction and arrangement of the several parts, without departing from the spirit of my invention, as disclosed in the appended claims.

Having thus described my invention, what I claim and desire to secure by Letters Patent is:

1. A classifier or dewaterer of the type mentioned, comprising a vessel having a bottom discharge orifice for quickly settling and heavy particles, and a rim overflow for slowly settling and light particles, a valve to control said bottom discharge orifice, a compartment arranged in the vessel and formed with a constricted mouth opening into the interior of the vessel in position to be obstructed by the rising body of settled material in the vessel, a float in the compartment operatively connected with the valve, means to conduct material to be treated directly to the vessel and separate means to conduct liquid of a lighter density directly to the float compartment, whereby when the accumulated solids in the vessel obstruct the mouth of the said compartment, the liquid admitted to the latter rises within and lifts the float and thereby opens the valve.

2. A classifier or dewaterer of the type mentioned, comprising an inverted cone-shaped vessel for receiving the material to be treated and having a bottom discharge orifice, a valve to control said discharge orifice, a funnel-shaped lighter liquid compartment disposed centrally in the vessel and having a restricted mouth opening into the interior of the vessel below the top of the latter and operable solely in the lighter liquid, a float in said compartment operatively connected with the valve, means for supplying material to be treated to the vessel outside of said compartment, separate means for supplying liquid to said compartment, whereby when the accumulated solids in the vessel rise to a height sufficient to obstruct the mouth of the compartment, the liquid admitted to the latter rises within and lifts the float for the purpose of opening the valve.

3. A classifier and dewaterer comprising a vessel having a rim overflow and a bottom discharge orifice, a valve controlling the orifice, a valve compartment in the vessel opening at its bottom into the vessel, a float in the compartment operatively connected to the valve, means for delivering the material to be treated directly to the vessel, and means for delivering a liquid substantially of non-varying density directly to the compartment.

CHARLES ALLEN.